United States Patent
Takizawa et al.

(10) Patent No.: US 9,844,882 B2
(45) Date of Patent: Dec. 19, 2017

(54) CONVEYOR ROBOT SYSTEM PROVIDED WITH THREE-DIMENSIONAL SENSOR

(71) Applicant: FANUC Corporation, Yamanashi (JP)

(72) Inventors: Shouta Takizawa, Yamanashi (JP); Fumikazu Warashina, Yamanashi (JP); Kazunori Ban, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/014,656

(22) Filed: Feb. 3, 2016

(65) Prior Publication Data
US 2016/0229061 A1 Aug. 11, 2016

(30) Foreign Application Priority Data
Feb. 6, 2015 (JP) .................................. 2015-022623

(51) Int. Cl.
*B25J 9/16* (2006.01)
*G05B 15/02* (2006.01)

(52) U.S. Cl.
CPC .......... *B25J 9/1697* (2013.01); *B25J 9/1679* (2013.01); *B25J 9/1694* (2013.01); *G05B 15/02* (2013.01); *G05B 2219/40053* (2013.01); *Y10S 901/02* (2013.01); *Y10S 901/31* (2013.01); *Y10S 901/40* (2013.01); *Y10S 901/46* (2013.01)

(58) Field of Classification Search
CPC .................... B25J 9/1697; G05B 2219/40053
See application file for complete search history.

(56) References Cited

U.S. PATENT DOCUMENTS

| 8,132,835 B2 * | 3/2012 | Ban | B25J 15/0266 |
| | | | 294/183 |
| 8,295,975 B2 * | 10/2012 | Arimatsu | B25J 9/1697 |
| | | | 700/216 |
| 8,538,579 B2 * | 9/2013 | Cottone | B25J 9/1697 |
| | | | 414/730 |

(Continued)

FOREIGN PATENT DOCUMENTS

| DE | 102013018222 A1 | 4/2014 |
| JP | 6-127722 A | 5/1993 |

(Continued)

OTHER PUBLICATIONS

Ueshiba, T. et al., "A Survey of Camera Calibration Techniques", Information Processing Society of Japan, CVIM 148, Mar. 3, 2005, pp. 1-18.

(Continued)

*Primary Examiner* — Thomas Randazzo
(74) *Attorney, Agent, or Firm* — Hauptman Ham, LLP

(57) ABSTRACT

A robot system is provided with a three-dimensional sensor which acquires three-dimensional information of an object, and a robot which includes a gripping device for gripping an object. The robot system uses first three-dimensional information which relates to a state before an object is taken out and second three-dimensional information which relates to a state after an object is taken out as the basis to acquire three-dimensional shape information of an object, and uses the three-dimensional shape information of the object as the basis to calculate a position and posture of the robot when an object is placed at a target site.

7 Claims, 13 Drawing Sheets

(56) References Cited

U.S. PATENT DOCUMENTS

| | | | |
|---|---|---|---|
| 8,751,048 B2* | 6/2014 | Shimizu | B25J 9/1679 |
| | | | 700/245 |
| 9,233,470 B1* | 1/2016 | Bradski | B25J 9/163 |
| 9,604,363 B2* | 3/2017 | Ban | B25J 9/0093 |
| 2010/0027254 A1 | 2/2010 | Nakayama | |
| 2015/0003678 A1* | 1/2015 | Watanabe | B25J 9/1697 |
| | | | 382/103 |

FOREIGN PATENT DOCUMENTS

| | | |
|---|---|---|
| JP | H07-053054 A | 2/1995 |
| JP | H07-299782 A | 11/1995 |
| JP | 2001-317911 A | 11/2001 |
| JP | 2010-005769 A | 1/2010 |
| JP | 2011-247819 A | 12/2011 |
| JP | 2012-192490 A | 10/2012 |
| JP | 2013-101045 A | 5/2013 |
| JP | 2013-154457 A | 8/2013 |
| JP | 2014-50936 A | 3/2014 |
| JP | 2014-176923 A | 9/2014 |
| WO | 2012/089928 A1 | 7/2012 |

OTHER PUBLICATIONS

Salvi, J. et al., "A Review of Recent Range Image Registration Methods with Accuracy Evaluation", Image and Vision Computing, May 16, 2006, pp. 1-19.

\* cited by examiner

CONVEYOR ROBOT SYSTEM PROVIDED WITH THREE-DIMENSIONAL SENSOR

RELATED APPLICATIONS

The present application claims priority to Japanese Application Number 2015-022623, filed Feb. 6, 2015, the disclosure of which is hereby incorporated by reference herein in its entirety.

BACKGROUND OF THE INVENTION

1. Field of the Invention

The present invention relates to a robot system which can be used to convey stacked objects.

2. Description of the Related Art

Known in the art is a robot system which successively conveys carton boxes and other stacked objects by a robot. The robot is provided at the tip end of an arm with a gripping device which grips an object and is configured so as to convey an object which is gripped by the gripping device to a target site situated at a separate location for subsequent processes.

In an existing robot system, a placement process is performed by operating a robot according to a command position prepared in advance so that the bottom surface of the object is flush with the surface of the target site. However, when the actual dimensions of the object differ from the expected dimensions, the object is not suitably positioned and as a result, excessive pushing force may be applied on the object or the object may fall off.

Another existing robot system is provided with a sensor which detects contact of the object with the target site and designed to release the object when the object contacts the target site. However, in such a robot system, an object has to be moved at a low speed from a position sufficiently far away from the target site toward the target site. Therefore, the conveyance efficiency is decreased.

Known various robot systems are configured to acquire position information of the stacked objects by sensors and perform a conveyance process (see Japanese Patent Publication Nos. 2010-005769, H07-053054, H07-299782, 2001-317911, 2013-154457, 2012-192490, and 2011-247819).

With the existing robot systems, it has been difficult to suitably perform the conveyance process when the three-dimensional shapes and dimensions of the objects are unknown or when there are substantial differences between individual objects. Therefore, there is a need for a robot system which is able to suitably perform a conveyance process even if the three-dimensional shapes or dimensions of objects are unknown.

SUMMARY OF THE INVENTION

According to a first aspect of the invention of the present application, there is provided a robot system configured to successively convey a plurality of stacked objects to a target site, the robot system comprising: a three-dimensional sensor configured to acquire three-dimensional information of the objects; a robot which comprises a gripping device capable of gripping at least one of the objects; a first three-dimensional information acquiring part configured to acquire three-dimensional information of the stacked objects by the three-dimensional sensor as first three-dimensional information; an object position acquiring part configured to identify a conveyance object which is an object to be conveyed among the objects and acquire the position of the conveyance object, based on the first three-dimensional information; a second three-dimensional information acquiring part configured to acquire, after the conveyance object is gripped by the gripping device and is moved away from other remaining objects by the robot, three-dimensional information of the remaining objects by the three-dimensional sensor as second three-dimensional information; a shape information acquiring part configured to acquire, based on the first three-dimensional information and the second three-dimensional information, three-dimensional shape information of the conveyance object which includes a part which is positioned at a dead angle of the three-dimensional sensor when the first three-dimensional information is acquired; a placement information acquiring part configured to acquire, based on the three-dimensional shape information of the conveyance object which is acquired by the shape information acquiring part, at least one of a distance from a contact part of the conveyance object to a reference point of the gripping device or the robot and a stable posture of the conveyance object, the contact part being a part of the conveyance object on which the conveyance object contacts the target site when the conveyance object is placed at the target site, the stable posture being a posture with which the conveyance object can be stably placed at the target site; and a position and posture calculating part configured to calculate a position and posture of the robot when the conveyance object is placed at the target site, based on at least one of the distance from the contact part to the reference point and the stable posture.

According to a second aspect of the invention of the present application, there is provided the robot system according to the first aspect which further comprises a third three-dimensional information acquiring part configured to acquire three-dimensional information of the conveyance object which is gripped by the gripping device by the three-dimensional sensor as third three-dimensional information, wherein the shape information acquiring part is configured to acquire three-dimensional shape information of the conveyance object, based on the first three-dimensional information, the second three-dimensional information, and the third three-dimensional information.

According to a third aspect of the invention of the present application, there is provided the robot system according to the first or second aspect wherein the first three-dimensional information acquiring part is configured to acquire, after at least one of the objects is conveyed, the second three-dimensional information which is obtained when a previous conveyance process is performed, as the first three-dimensional information.

According to a fourth aspect of the invention of the present application, there is provided the robot system according to any one of the first to third aspects wherein the three-dimensional sensor is attached to a support separate from the robot.

According to a fifth aspect of the invention of the present application, there is provided the robot system according to any one of the first to third aspects wherein the three-dimensional sensor is attached to a tip end part of an arm of the robot.

According to a sixth aspect of the invention of the present application, there is provided a robot system configured to successively convey a plurality of stacked objects to a target site, the robot system comprising: a three-dimensional sensor configured to acquire three-dimensional information of the objects; a robot which comprises a gripping device capable of gripping at least one of the objects; a first three-dimensional information acquiring part configured to acquire three-dimensional information of the stacked objects by the three-dimensional sensor as first three-dimensional information; an object position acquiring part configured to identify a conveyance object which is an object to be conveyed among the objects and acquire the position of the conveyance object, based on the first three-dimensional information; a third three-dimensional information acquiring part configured to acquire three-dimensional information of the conveyance object being gripped by the gripping device, by the three-dimensional sensor, as third three-dimensional information; a shape information acquiring part configured to acquire, based on the first three-dimensional information and the third three-dimensional information, three-dimensional shape information of the conveyance object which includes a part which is positioned at a dead angle of the three-dimensional sensor when the first three-dimensional information is acquired; a placement information acquiring part configured to acquire, based on the three-dimensional shape information of the conveyance object which is acquired by the shape information acquiring part, at least one of a distance from a contact part of the conveyance object to a reference point of the gripping device or the robot and a stable posture of the conveyance object, the contact part being a part of the conveyance object on which the conveyance object contacts the target site when the conveyance object is placed at the target site, the stable posture being a posture with which the conveyance object can be stably placed at the target site; and a position and posture calculating part configured to calculate a position and posture of the robot when the conveyance object is placed at the target site, based on at least one of the distance from the contact part to the reference point and the stable posture.

According to a seventh aspect of the invention of the present application, there is provided the robot system according to the sixth aspect wherein at least one of the position and posture of the robot when the third three-dimensional information is acquired differs from when the conveyance object is gripped by the gripping device.

These and other objects, features and advantages of the present invention will become more apparent in light of the detailed description of exemplary embodiments thereof as illustrated in the drawings.

DESCRIPTION OF EMBODIMENTS

Embodiments of the present invention will be described with reference to the accompanying drawings. The constituent elements of the illustrated embodiments may be changed in scale as necessary to facilitate understanding of the present invention. The same or corresponding constituent elements are assigned the same reference notations.

Figure 1:
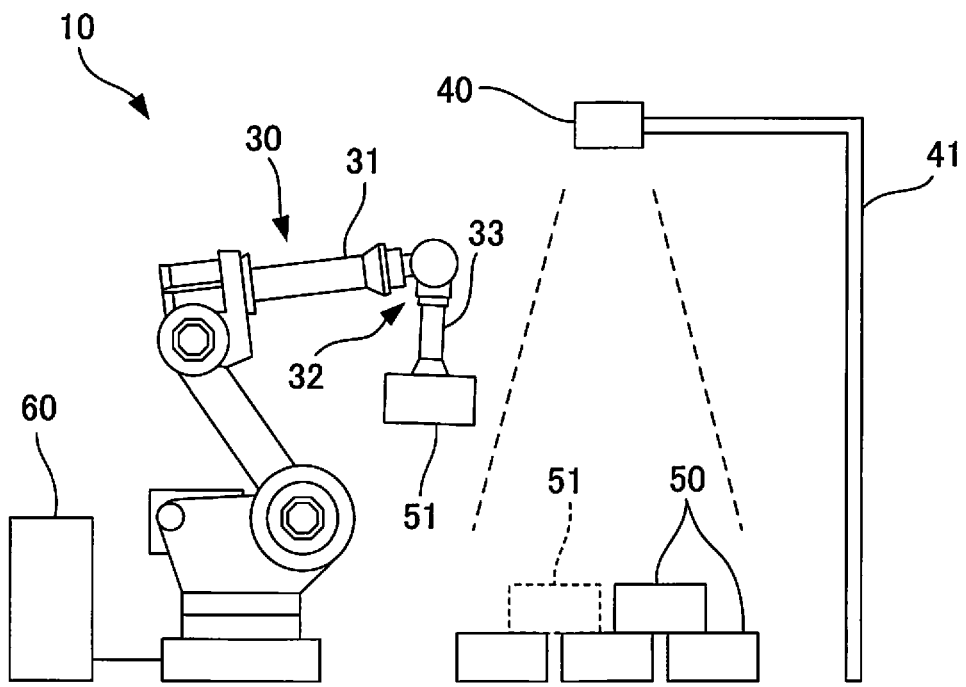
FIG. 1 is a schematic view showing the configuration of a robot system according to one embodiment.

FIG. 1 is a schematic view showing the configuration of a robot system according to one embodiment. The robot system 10 is provided with a robot 30 which has a wrist 32 at the tip end of an arm 31, a gripping device 33 which is attached to the wrist 32 of the robot 30, a robot control device 60 which controls the robot 30, and a three-dimensional sensor 40 which is attached to a support 41. Although the illustrated robot 30 is a vertical articulated robot, a movement mechanism robot, parallel link robot, linear drive mechanism robot, or any other type of robot may also be used.

The robot control device 60 is connected by a communication cable or other known communicating means to the robot 30. In response to control commands transmitted from the robot control device 60, servomotors provided at the joint axes are driven so as to operate the robot 30 to realize a desired position and posture.

The gripping device 33 is attached to the robot 30 through a mechanical interface which is formed at the wrist 32. The gripping device 33 is not limited to any particular shape and configuration, so long as it can convey at least one object 50 without interference with surrounding other objects 50, a container or pallet (not shown) which accommodates the objects 50, etc. in the gripping process. For example, the gripping device 33 is a mechanical type gripping device which mechanically applies pressure to the objects 50, a vacuum suction type gripping device which generates negative pressure and applies suction pressure to the objects 50, or a magnetic type gripping device which uses magnetic force to apply an attraction force to the objects 50.

Figure 2:
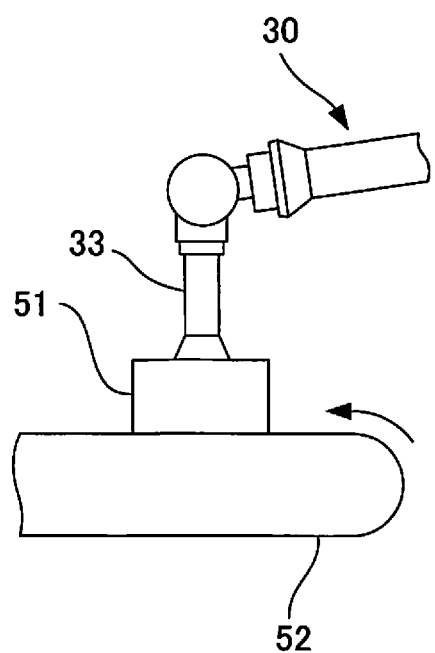
FIG. 2 shows a target site and an object placed at the target site.

The objects 50 are provided in a stacked state as illustrated. In the present specification, an object which is gripped by the gripping device 33 for performing a conveyance process may be referred to as "the conveyance object" to differentiate it from other objects. According to the robot system 10, a conveyance object 51 which is gripped by the gripping device 33 is moved by the robot 30 away from the other objects 50 and placed on a target site 52 as shown in FIG. 2. The target site 52 is not limited to any specific form, so long as it is configured to allow a conveyance object 51 to be stably placed. The target site 52 may be, for example, a conveyor which is designed to move the objects to be conveyed 51 successively for the subsequent processes. The target site 52 may also be a desk, pallet, or jig which does not have a conveyor or other independent movement mechanism.

The three-dimensional sensor 40 is provided generally above the stacked objects 50. The three-dimensional sensor 40 is configured to acquire three-dimensional position information of a plurality of points present on the surfaces of the objects 50 and output the group of the acquired three-dimensional points as three-dimensional information.

The configuration of the three-dimensional sensor 40 is not limited at all. For example, it is any sensor which uses the spatial code system, phase shift system, random dot pattern system, TOF system, light interrupting system, stereo camera system, or other known principles. The format of the output of the three-dimensional information is not limited at all. For convenience, the embodiments will be described herein with reference to an exemplary configuration in which the three-dimensional information includes a group of three-dimensional points (also known as a "point cloud").

The three-dimensional sensor 40 is calibrated in advance so as to be able to acquire three-dimensional information in a reference coordinate system of the robot system 10. The calibration is performed by a known method in order to associate the sensor coordinate system and reference coordinate system with each other (for example, see "Camera Calibration," CVIM 148, PP. 1 to 18, 2005).

The sensor control device which controls the three-dimensional sensor 40 (not shown) may be built in the robot control device 60 or may be provided separately from the robot control device 60. In one embodiment, the three-dimensional sensor 40 may be configured so as to acquire not only three-dimensional position information, but also a grayscale image or color image or other two-dimensional information.

Figure 3:
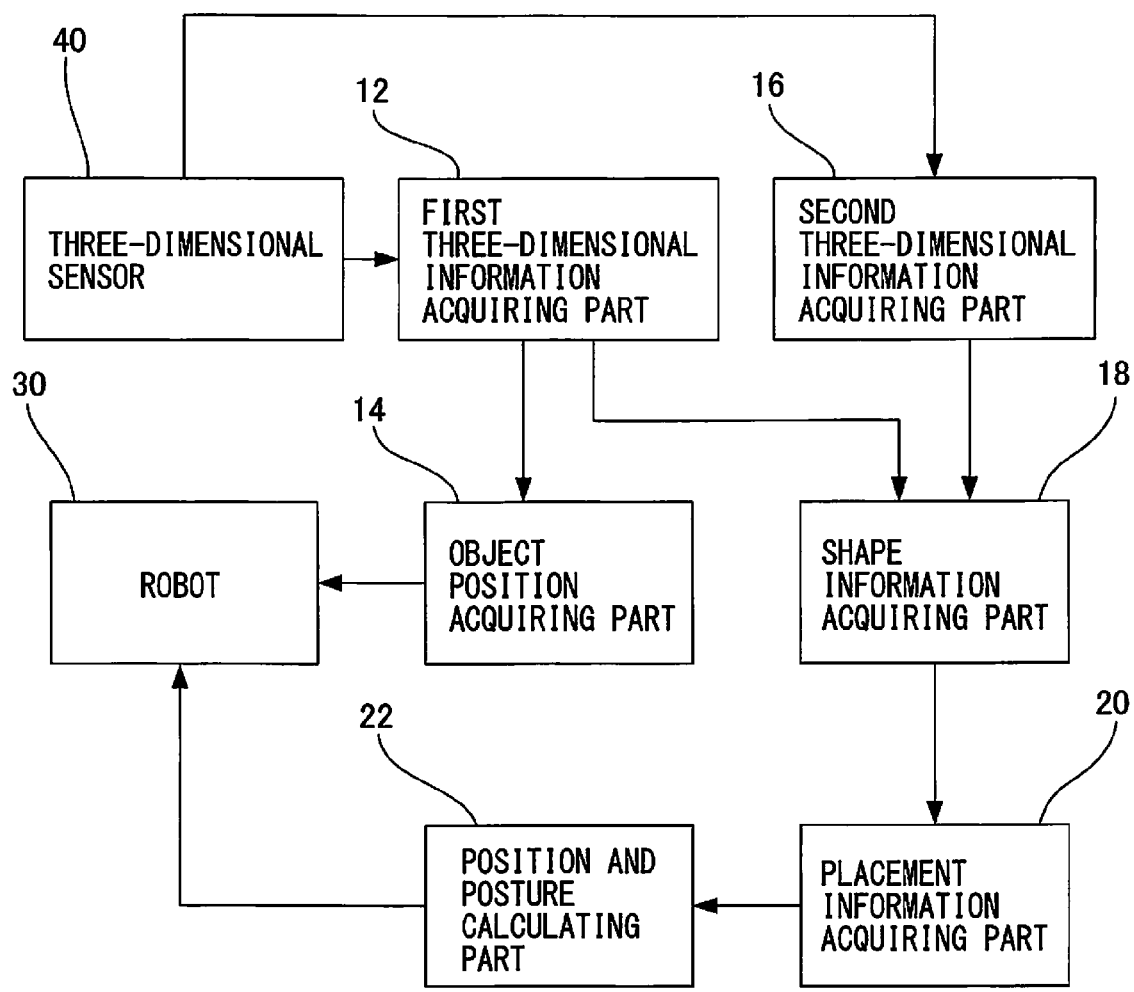
FIG. 3 is a functional block diagram of a robot system according to one embodiment.

FIG. 3 is a functional block diagram of a robot system 10. As illustrated, the robot system 10 is provided with a first three-dimensional information acquiring part 12, object position acquiring part 14, second three-dimensional information acquiring part 16, shape information acquiring part 18, placement information acquiring part 20, and position and posture calculating part 22. Calculations, storage and readout of information, and the transmission and receipt of data and signals are, performed by a digital computer which has a CPU, ROM, RAM, or another known hardware configuration, in order to perform the various functions.

The first three-dimensional information acquiring part 12 acquires the three-dimensional information of the stacked plurality of objects 50 by the three-dimensional sensor 40 as the first three-dimensional information. The first three-dimensional information is three-dimensional information of the objects 50 in the state prior to conveyance of the conveyance object 51.

The object position acquiring part 14 uses the first three-dimensional information as the basis to identify the conveyance object 51 among the objects 50 and acquires the position of the conveyance object 51. The conveyance object 51 may be, for example, an object present at the highest position among the objects 50. Alternatively, it may be possible to select as the conveyance object 51 an object in a position where it can be gripped most easily, depending on the type of the gripping device 33, or an object which can be taken out without interference with surrounding objects 50.

The method for recognizing the position of the conveyance object 51 based on the three-dimensional information is not limited to a particular method, and any known method can be employed (for example, see "A review of recent range image registration methods with accuracy evaluation", Image and Vision Computing Volume 25, Issue 5, pp. 578-596, 2007). Further, as described in Japanese Patent Publication No. 2013-101045, three-dimensional information and two-dimensional information may be combined for recognition of the position of the conveyance object 51. The position of the conveyance object 51 is used for positioning the gripping device 33 in the gripping process. That is, the position and posture of the robot 30 are controlled in accordance with the position of the conveyance object 51, so that the gripping device 33 is positioned at a suitable position for gripping the conveyance object 51.

The second three-dimensional information acquiring part 16 acquires, after the conveyance object 51 is gripped by the gripping device 33 and moved away from the remaining objects 50 by the robot 30, the three-dimensional information of the remaining objects 50 by the three-dimensional sensor 40 as the second three-dimensional information. The second three-dimensional information is acquired after the robot 30 and conveyance object 51 are moved outside of the range of detection of the three-dimensional sensor 40, which is shown by the dashed line of FIG. 1. However, if there is no obstacle when acquiring the second three-dimensional information, the second three-dimensional information may be acquired in the state where the conveyance object 51 or robot 30 is included in the range of detection of the three-dimensional sensor 40.

The shape information acquiring part 18 acquires, based on the first three-dimensional information and second three-dimensional information, the three-dimensional shape information of the conveyance object 51 which includes a part which is positioned at the dead angle of the three-dimensional sensor 40 when the first three-dimensional information is acquired. When acquiring the first three-dimensional information, the part of the conveyance object 51 at the opposite side from the three-dimensional sensor 40 is positioned at the dead angle of the three-dimensional sensor 40 and therefore the three-dimensional information is not acquired. Therefore, according to the present embodiment, by comparing the first three-dimensional information and the second three-dimensional information, it is possible to obtain the shape information of the location of the conveyance object 51 which is not included in the first three-dimensional information. Due to this, the three-dimensional shape can be acquired for a substantially entire part of the conveyance object 51.

The placement information acquiring part 20 acquires, based on the three-dimensional shape information of the conveyance object 51 which is acquired by the shape information acquiring part 18, at least one of the distance from the contact part of the conveyance object 51 which contacts the target site 52 when placing the conveyance object 51 at the target site 52 to a reference point of the gripping device 33 or robot 30 and the stable posture of the conveyance object 51 which allows the conveyance object 51 to be stably placed at the target site 52.

The position and posture calculating part 22 calculates, based on at least one of the distance from the contact part of the conveyance object 51 to the reference point of the gripping device 33 or robot 30 and the stable posture of the conveyance object 51, the position and posture of the robot 30 when placing the conveyance objects 51 on the target site 52.

Figure 4:
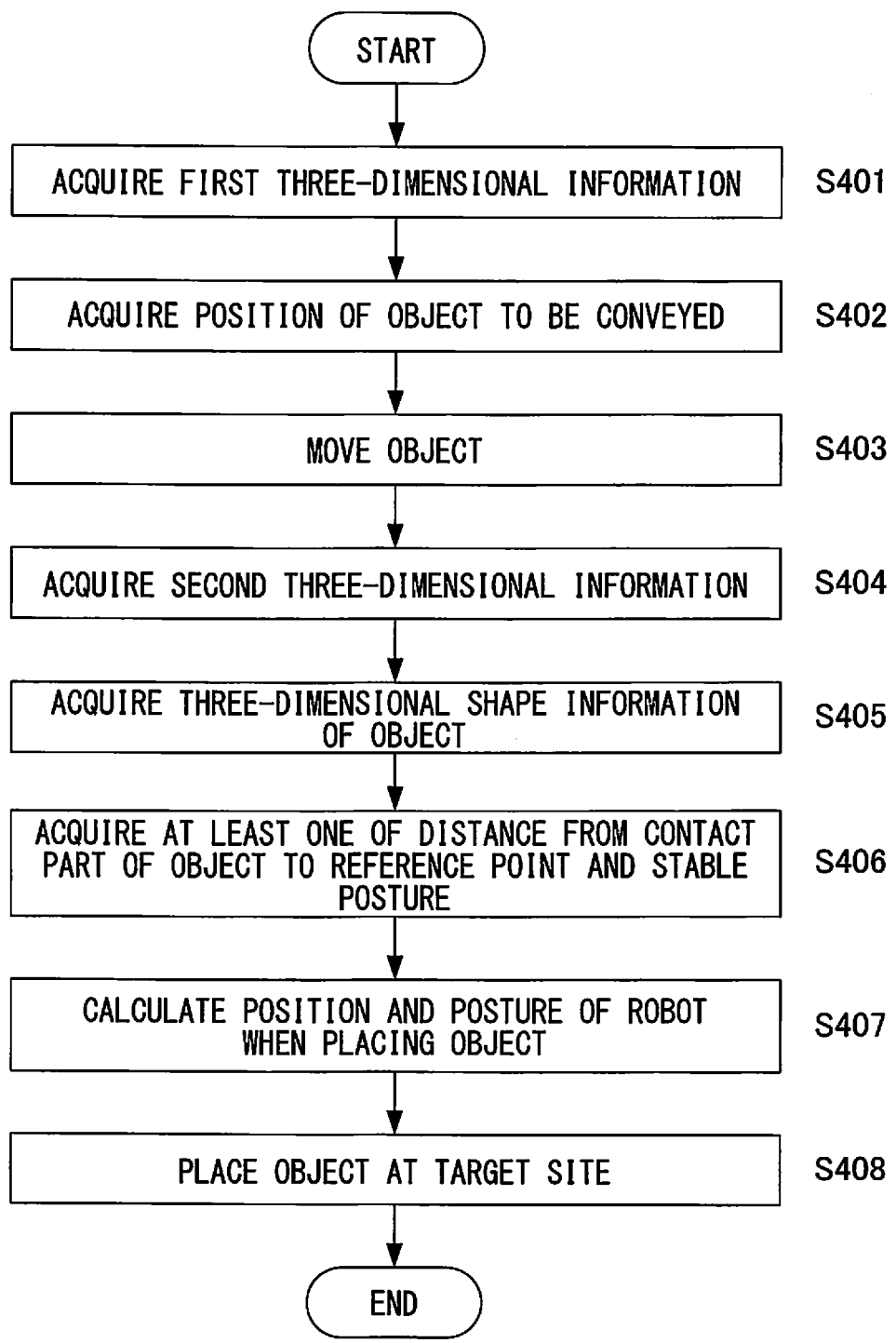
FIG. 4 is a flow chart showing a flow of a conveyance process which is performed by a robot system according to one embodiment.

FIG. 4 is a flow chart which shows the flow of a conveyance process which is performed by the robot system 10 according to the present embodiment. In the following explanation, an example where the object 50 has a rectangular parallelepiped shape (see FIG. 1 and FIG. 2) will be referred to as necessary.

Figure 5A:
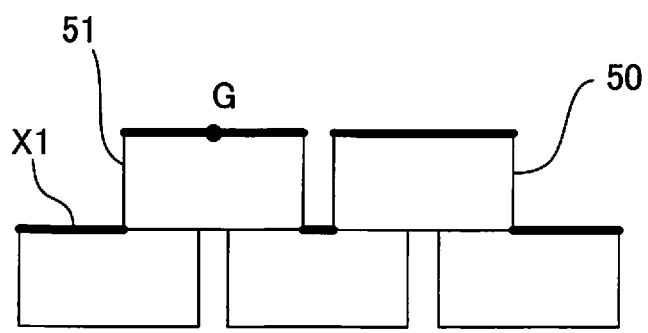
FIG. 5A shows first three-dimensional information.

First, at step S401, the first three-dimensional information acquiring part 12 acquires the three-dimensional information (first three-dimensional information) of the stacked objects 50. FIG. 5A shows the first three-dimensional information which is obtained in the case of five objects 50 stacked in two rows. The bold line X1 shows the range over which the three-dimensional points acquired as first three-dimensional information are distributed. Therefore, the first three-dimensional information X1 includes position information of a large number of three-dimensional points which are present on the surfaces of the objects 50.

At step S402, the object position acquiring part 14 identifies the conveyance object 51 and acquires the position of the conveyance object 51, based on the first three-dimensional information X1. The position of the conveyance object 51 acquired at step S402 may be, for example, the position of the center of gravity of the top surface of the conveyance object 51 (see "G" in FIG. 5A). While performing the processes of step S401 and step S402, the robot may perform other work as necessary.

At step S403, the robot 30 is driven to move the conveyance object 51 away from the remaining objects 50. The robot 30 is driven so as to position the gripping device 33 at a position where the gripping device 33 can grip the conveyance object 51, based on the position of the conveyance object 51 which is acquired at step S402. For example, when the gripping device 33 is a suction type gripping device which is configured so as to grip a conveyance object 51 at a single gripping point, the gripping device 33 is positioned so that a reference point of the gripping device 33 (for example, the gripping point) matches the position of the conveyance object 51 (for example, the center of gravity G). After completion of positioning the gripping device 33, the gripping device 33 is operated to grip the conveyance object 51. Thereafter, the robot 30 is controlled to move the conveyance object 51 move away from the remaining objects 50.

Figure 5B:
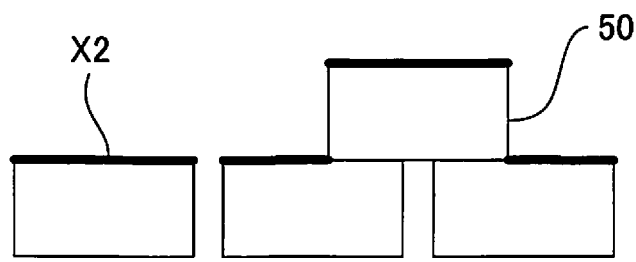
FIG. 5B shows second three-dimensional information.

At step S404, the second three-dimensional information acquiring part 16 detects the objects 50 remaining after the conveyance objects 51 is taken out by the three-dimensional sensor 40 and acquires second three-dimensional information X2 (see FIG. 5B). As shown in FIG. 5B, the three-dimensional information of the four objects 50 other than the conveyance object 51 is acquired as the second three-dimensional information X2.

At step S405, the shape information acquiring part 18 acquires three-dimensional shape information of the conveyance object 51 based on the first three-dimensional information and second three-dimensional information. The shape information includes shape information of a part of the conveyance object 51 which was positioned at the dead angle of the three-dimensional sensor 40 before the conveyance object 51 is taken out.

At step S406, the placement information acquiring part 20 acquires at least one of the distance from the contact part of the conveyance object 51 which contacts the target site 52 when placing the conveyance object 51 at the target site 52 to a reference point of the gripping device 33 (for example, the gripping point) and the stable posture of the conveyance object 51. Since the positional relationship between the robot 30 and the gripping device 33 is known, the reference point may be defined in relation to the robot 30.

In the case where the objects 50 have a rectangular parallelepiped shape and are stacked generally aligned relative to each other so that the bottom surface of the conveyance object 51 is flat, the conveyance object 51 can be stably placed at the target site 52 even without having to change the posture of the conveyance object 51. Therefore, in this case, the process of acquiring the stable posture at step S406 may be omitted. On the other hand, to suitably perform the placement process of the conveyance object 51, it is necessary to determine the distance from the reference point of the gripping device 33 (or of the robot 30) to the contact point of the conveyance object 51 (that is, the bottom surface). Conversely, the robot system 10 may be configured to omit the process of acquiring the distance from the reference point of the gripping device 33 or robot 30 to the contact part of the conveyance object 51 and acquire only the stable posture of the conveyance object 51. The distance from the contact part of the conveyance object 51 to the reference point and the specific method of acquiring the stable posture will be explained below.

At step S407, the position and posture calculating part 22 calculates the position and posture of the robot 30 when placing the conveyance object 51 at the target site 52. The position and posture of the robot 30 are calculated in accordance with at least one of the distance from the contact part of the conveyance object 51 to the reference point of the gripping device 33 or robot 30 and the stable posture of the conveyance object 51.

At step S408, the robot 30 is driven in accordance with the position and posture which are calculated at step S407, to move the conveyance object 51 to the target site 52. After the conveyance object 51 is moved in position, the gripping device 33 releases the conveyance object 51 and places it at the target site 52, thereby completing the conveyance process.

The processes of steps S401 to S408 are repeatedly performed until all of the objects 50 are conveyed. It should be noted that, in any of the second and subsequent conveyance processes, the process of step S401 may be omitted and the second three-dimensional information which is acquired during the previous conveyance process may be used instead as the first three-dimensional information. Alternatively, if the individual differences of the objects 50 are small, in the second and subsequent conveyance processes, the processes of step S401 to step S405 may be omitted and the same three-dimensional shape information of the conveyance object 51 may be used repeatedly.

Next, the method of finding the three-dimensional shape information of the conveyance object 51 from the three-dimensional information and calculating the distance from the contact part of the conveyance object 51 to the reference point of the gripping device 33 or robot 30 and the stable posture of the conveyance object 51, based on the three-dimensional shape information of the conveyance object 51, will be explained.

First Embodiment

Figure 6:
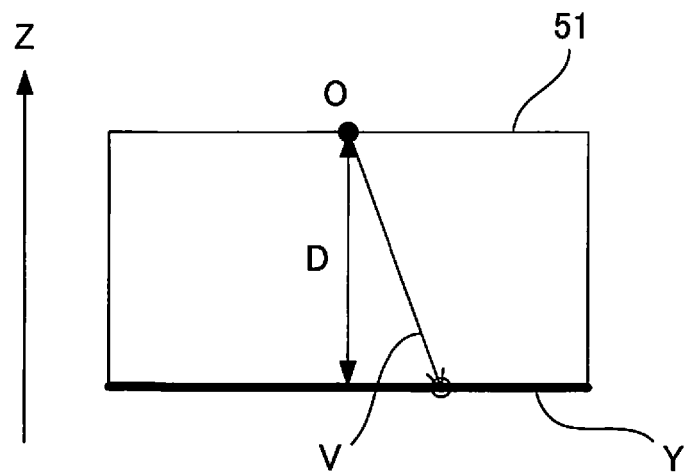
FIG. 6 shows a group of extracted points which are obtained based on first and second three-dimensional information.

Referring to FIG. 5A, FIG. 5B, and FIG. 6, a first embodiment will be explained. In this embodiment, the objects 50 have a rectangular parallelepiped shape. As explained above, the three-dimensional information X1 and X2 shown in FIG. 5A and FIG. 5B are configured from position information of the groups of a large number of three-dimensional points. The first three-dimensional information X1 and the second three-dimensional information X2 are compared to find the three-dimensional shape information of a conveyance object 51.

For example, the three-dimensional points of the first three-dimensional information which are nearest to the respective three-dimensional points of the second three-dimensional information will be defined as the "nearest points." The candidates for the nearest points may be limited so as to be chosen among three-dimensional points of the first three-dimensional information which are positioned within the range of a predetermined distance in the horizontal direction from the three-dimensional points of the second three-dimensional information. In this way, the time period which is required for calculating the nearest points can be shortened. The identical three-dimensional points of the first three-dimensional information may be commonly set as the nearest points for different three-dimensional points of the second three-dimensional information. It should be noted that "positioned the nearest" means the distance between the two points is the smallest. The "distance" may be defined in any manner, for example, as the Manhattan distance (L1 norm), Euclidean distance, Mahalanobis distance, maximum value norm, etc.

In addition, when the distance from a three-dimensional point of the second three-dimensional information X2 to the corresponding nearest point exceeds a predetermined threshold value, the nearest point is then extracted. The group of extracted nearest points (which may also be referred to as the "the group of extracted points") represents three-dimensional points whose positions have changed between the corresponding three-dimensional points before and after the conveyance object 51 is taking out. Therefore, the group of extracted points can be used as the basis to identify the shape of the opposite side of the conveyance object 51 in relation to the three-dimensional sensor 40, which is at the dead angle of the three-dimensional sensor 40 prior to the conveyance process.

The threshold value which is used to extract the group of extracted points may be, for example, set as necessary in accordance with the resolution of the three-dimensional sensor 40. Alternatively, the threshold value may be set in accordance with the individual differences of the objects 50, the required detection precision, or the dimensions of the thinnest part of the object 50.

In an alternative embodiment, among the three-dimensional points which are included in the first three-dimensional information X1, the group of three-dimensional points of the second three-dimensional information which are included in the same range in the horizontal direction with respect to the group of three-dimensional points which are included in the range of the conveyance object 51 may also be set as the group of extracted points.

FIG. 6 shows the group Y of extracted points which are found for the conveyance object 51. In FIG. 6, "O" indicates the reference point of the gripping device 33. For example, the reference point O may be the gripping point of the gripping device 33. The maximum value of the components in the Z-axis direction (for example, the vertical direction) of the vectors V from the reference point O of the gripping device 33 to the individual three-dimensional points of the group Y of extracted points is defined as the distance D from the reference point O to the contact part of the conveyance object 51 on which the conveyance object 51 contacts the target site 52.

According to the present embodiment, in the placement process of the conveyance object 51, the robot 30 is controlled so that the reference point O of the gripping device 33 is moved at a position distant from the surface of the target site 52 by the distance D.

Second Embodiment

Figure 7A:
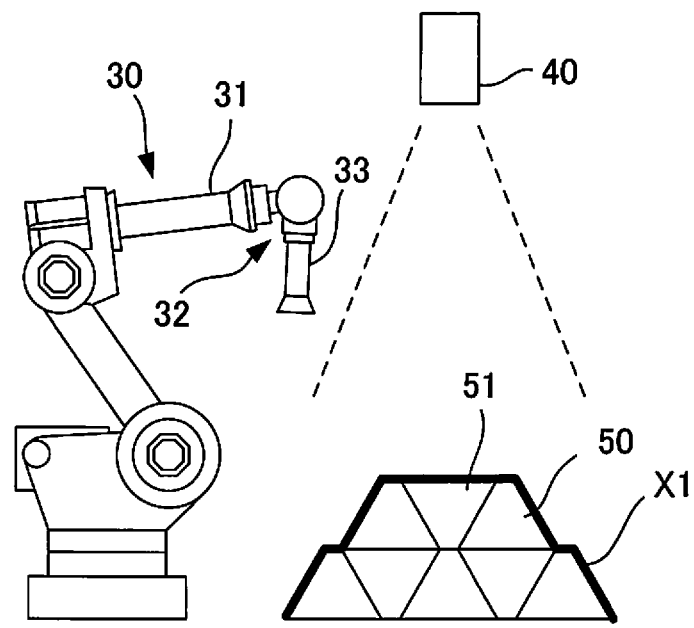
FIG. 7A shows first three-dimensional information.

Referring to FIG. 7A, FIG. 7B, FIG. 8, and FIG. 9, a second embodiment will be explained. The present embodiment corresponds to the case where it is necessary to obtain a stable posture for stably placing a conveyance object 51 in the placement process. As shown in FIG. 7A, when the objects 50 have a frustum shape, the area of the bottom part of the stacked conveyance object 51 is small. For this reason, in order to stably place the conveyance object 51 at the target site 52, it is necessary to acquire the stable posture of the conveyance object 51 during the conveyance process. Therefore, in the present embodiment, in addition to the distance from the reference point O of the gripping device 33 to the contact part of the conveyance object 51, the stable posture of the conveyance object 51 is acquired.

Figure 7B:
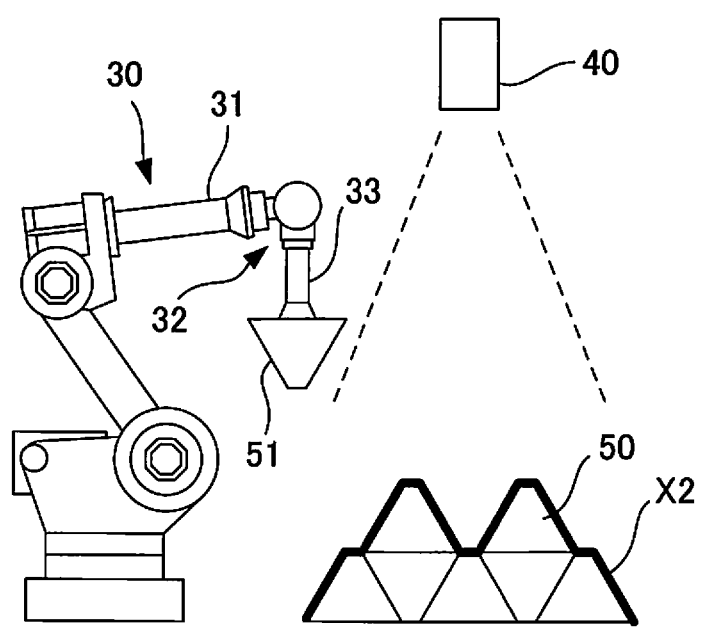
FIG. 7B shows second three-dimensional information.
Figure 8:
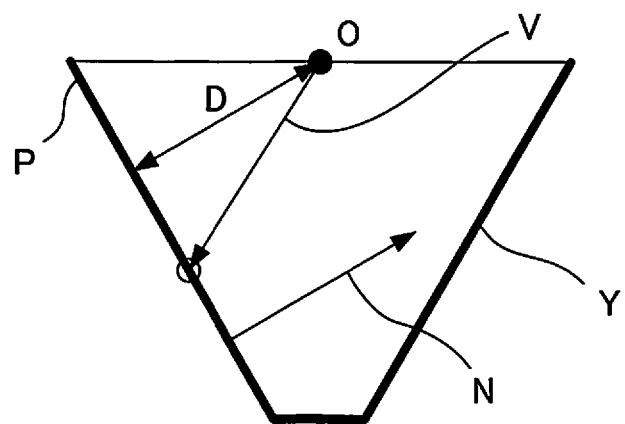
FIG. 8 shows a group of extracted points which are obtained based on first and second three-dimensional information.
Figure 9:
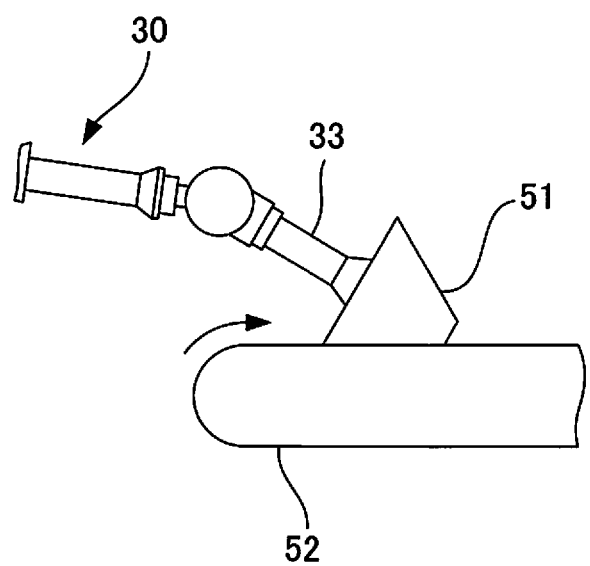
FIG. 9 shows a target site and an object placed at the target site.

In FIG. 7A, the bold line X1 indicates the first three-dimensional information, while in FIG. 7B, the bold line X2 indicates the second three-dimensional information. In the same way as the first embodiment, the first three-dimensional information X1 and the second three-dimensional information X2 are used as the basis to extract a group of three-dimensional points which change in position before and after the process of taking out the conveyance object 51 as a group of extracted points. In FIG. 8, the bold line Y indicates the group of extracted points.

In the group Y of extracted points, a plane having the maximum area, or the plane P, is identified. If the conveyance object 51 is placed so as to contact the target site 52 on the plane P, the conveyance object 51 can be stably placed (see FIG. 9). The stable posture of the conveyance object 51 is found in accordance with the direction of the normal vector N with respect to the plane P. Accordingly, the posture of the robot 30 is calculated so that the normal vector N is oriented vertically upward. This allows the conveyance object 51 to be placed at the target site 52 with a stable posture. If there is another plane having an area over a predetermined threshold value, other than the plane P which has the maximum area, the stable posture may also be a posture with which the conveyance object 51 is placed at the target site 52 on the above-mentioned plane.

The distance from the reference point O of the gripping device 33 to the plane P can be found based on the vector V which is defined from the reference point O to each three-dimensional point of the set Y of extracted points and the normal vector N. For example, the maximum value of the internal product of the vector V and the normal vector N may be defined as the distance D from the reference point O to the plane P. By controlling the robot 30 in accordance with the orientation of the normal vector N and the distance D, the conveyance object 51 can be moved to the position required for stable stacking.

In another embodiment, for example, in the case where the conveyance object 51 contacts the target site 52 on a curved portion of the conveyance object 51, an approximation plane may be found for each region with a curvature which is equal to or less than a predetermined threshold value, and based on the normal vector to the approximation plane which has the maximum area, the stable posture may be determined.

Third Embodiment

Figure 10:
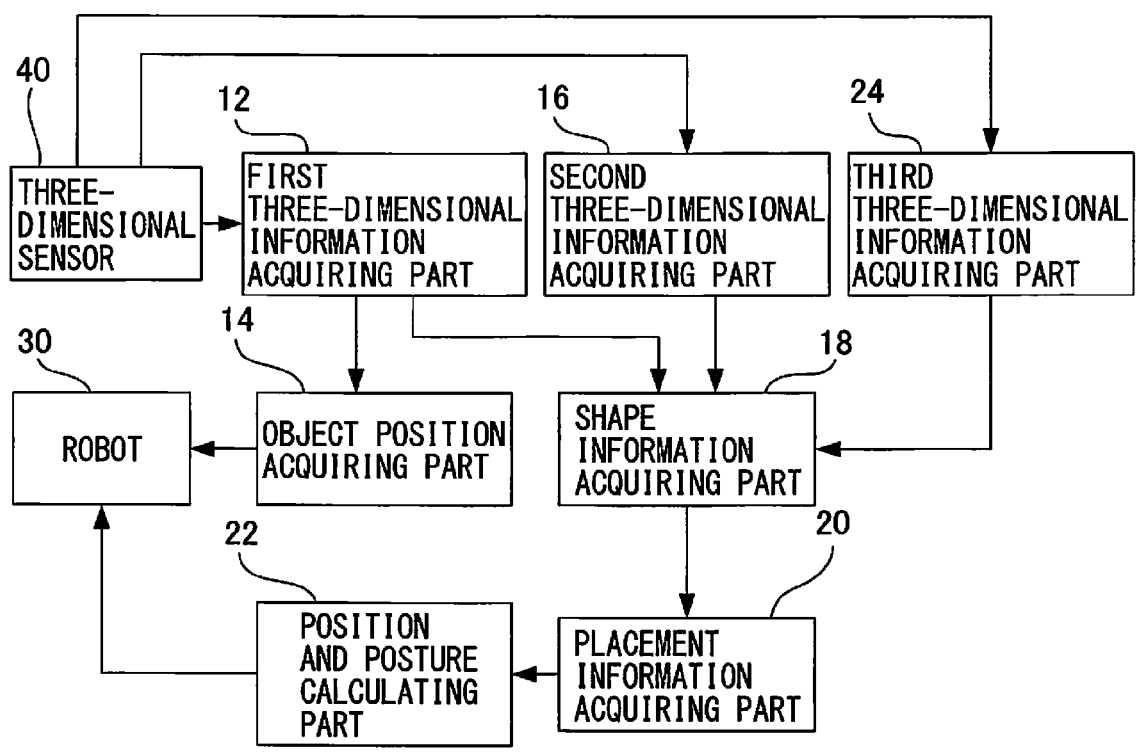
FIG. 10 is a functional block diagram of a robot system according to another embodiment.
Figure 11:
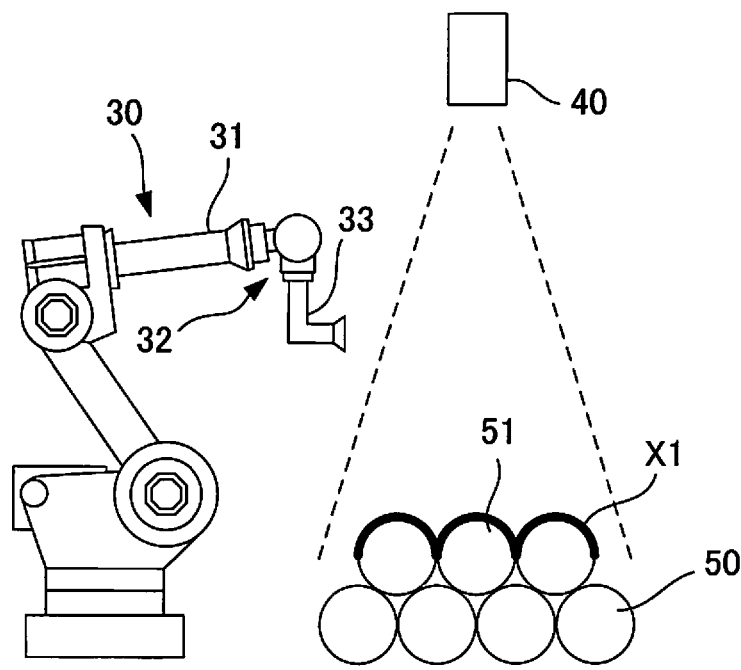
FIG. 11 shows first three-dimensional information.
Figure 12:
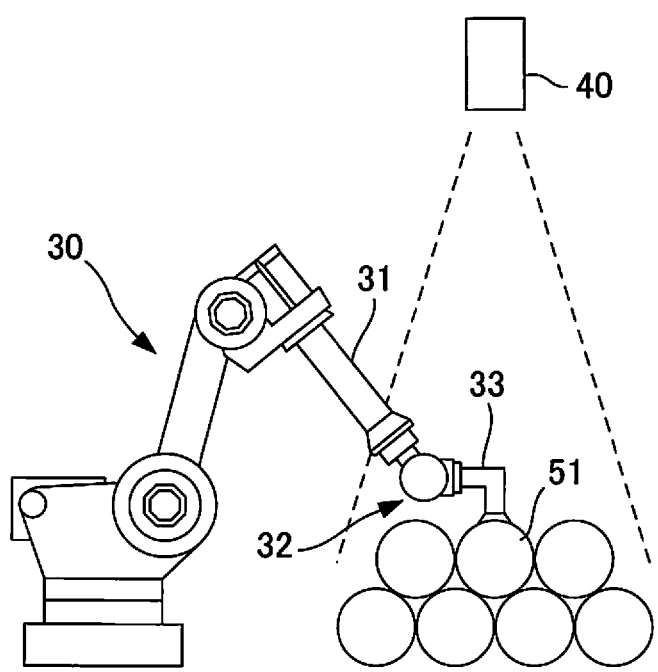
FIG. 12 shows a process for gripping an object.

Referring to FIG. 10 to FIG. 15, a third embodiment will be explained. In this embodiment, the objects 50 have a generally cylindrical shape, as shown in FIG. 11.

FIG. 10 is a functional block diagram of a robot system 10 according to the present embodiment. As will be understood in comparison of FIG. 3 with FIG. 10, the robot system 10 is further provided with a third three-dimensional information acquiring part 24.

Figure 13:
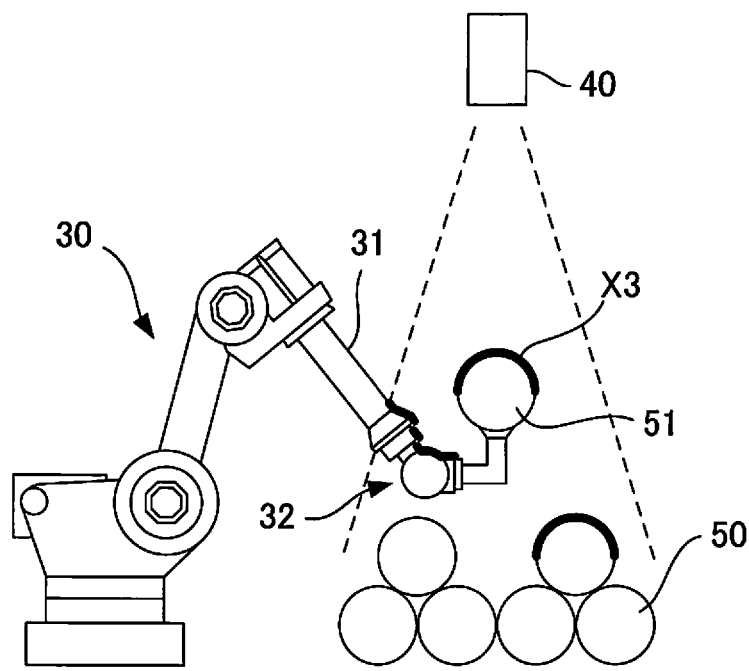
FIG. 13 shows third three-dimensional information.

The third three-dimensional information acquiring part 24 acquires three-dimensional information of the conveyance object 51 which is gripped by the gripping device 33 as third three-dimensional information by the three-dimensional sensor 40. For example, the third three-dimensional information, as shown in FIG. 13, is acquired by gripping the conveyance object 51, then operating the robot 30, and rotating the wrist 32 to change the posture of the gripping device 33.

The method of acquiring the group Y of extracted points in the robot system 10 according to the present embodiment will be explained. First, in the same way as the other embodiments, first three-dimensional information X1 is acquired (see FIG. 11). Then, the position and posture of the robot 30 (which may be referred to as "the first robot position") at the point of time when the robot 30 is moved to a position where the gripping device 33 can grip a conveyance object 51 (see FIG. 12) are acquired. Next, as shown in FIG. 13, the robot 30 is moved and the wrist 32 is rotated to change the posture of the gripping device 33 and acquire third three-dimensional information X3 which includes a part on the opposite side of the conveyance object 51. Further, the position and posture of the robot 30 when acquiring the third three-dimensional information X3 (which may be referred to as "the second robot position") are acquired.

Next, based on the difference between the first robot position and the second robot position, the group Y of extracted points is acquired through homogeneous transformation of the third three-dimensional information. For example, the homogeneous transformation matrix which corresponds to the first robot position is denoted as H1, while the homogeneous transformation matrix which corresponds to the second robot position is denoted as H2. In this case, the homogenous transformation matrix H3 corresponding to the amounts of change in the position and posture of the conveyance object 51 can be expressed by the following formula:

$$H3 = H1 \times H2^{-1}$$

where $H2^{-1}$ is an inverse matrix of H2.

Figure 14:
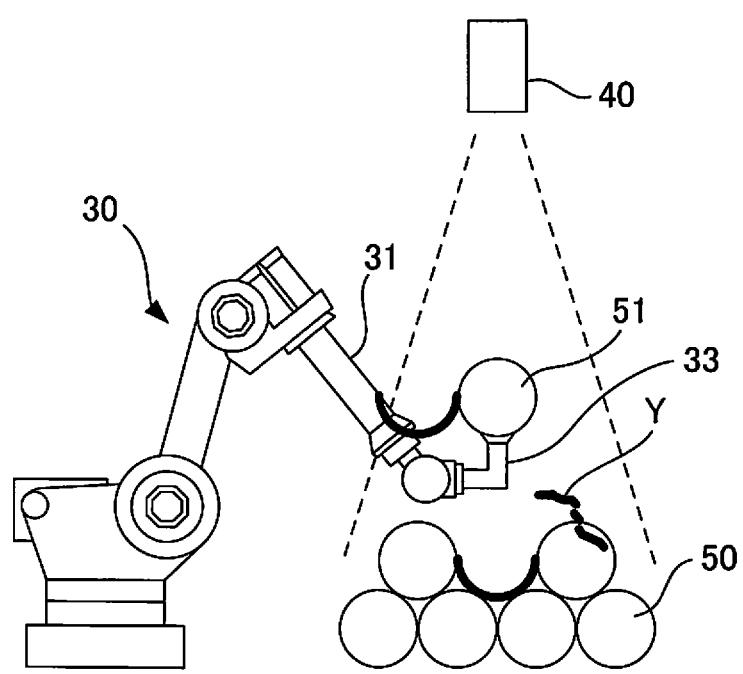
FIG. 14 shows a group of extracted points which are obtained by applying homogeneous transformation to the three-dimensional points of the third three-dimensional information.
Figure 15:
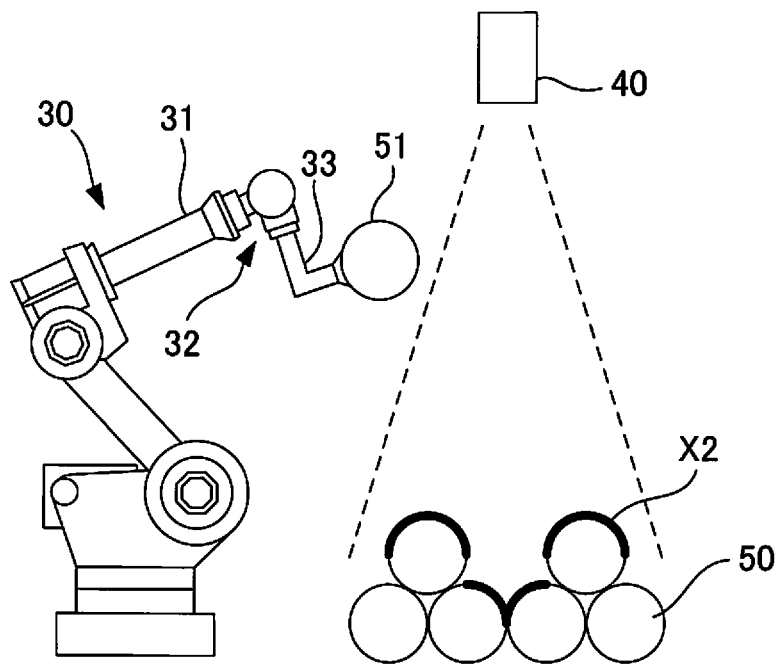
FIG. 15 shows second three-dimensional information.

By applying the homogeneous transformation matrix H3 to the respective three-dimensional points of the third three-dimensional information X3, a group of extracted points is obtained, as shown by the bold line Y in FIG. 14. Based on the first three-dimensional information X1 shown in FIG. 11 and the group Y of extracted points shown in FIG. 14, three-dimensional shape information of the conveyance object 51 is acquired. According to one embodiment, the third three-dimensional information may also be acquired over a plurality of times. According to one embodiment, in addition to the first three-dimensional information X1 and third three-dimensional information X3, second three-dimensional information X2 shown in FIG. 15 may be further used to acquire the three-dimensional shape information of the conveyance object 51. As described above, the second three-dimensional information X2 is three-dimensional information of the objects 50 which is acquired after the conveyance object 51 is moved away from the remaining objects 50.

Fourth Embodiment

Figure 16:
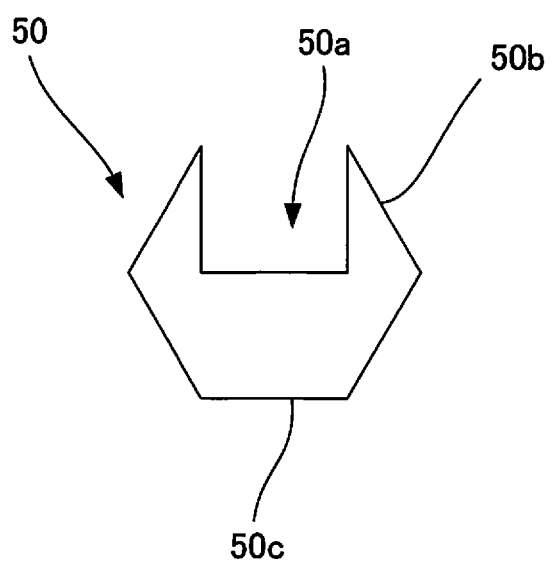
FIG. 16 shows an example of an object.
Figure 17:
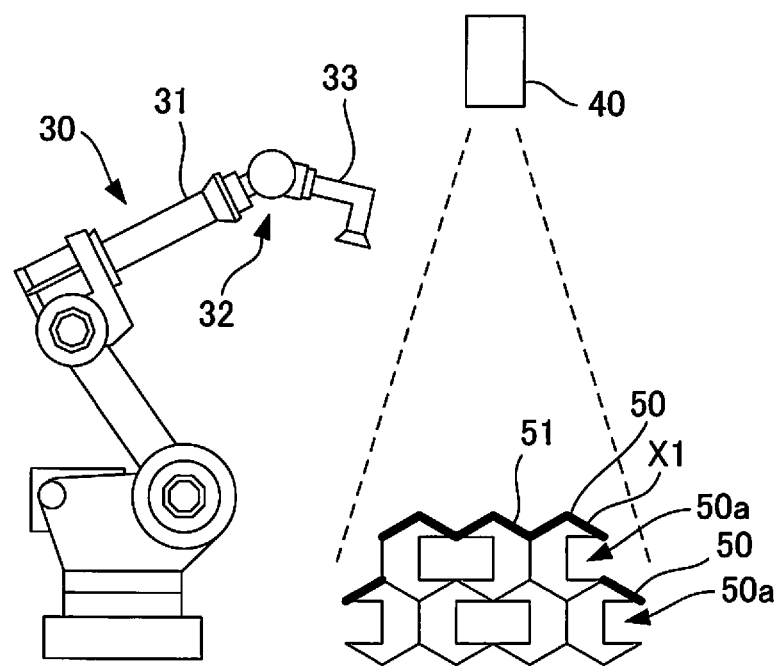
FIG. 17 shows first three-dimensional information.

Referring to FIG. 16 to FIG. 21, a fourth embodiment will be explained. In the present embodiment, in order to find the stable posture of the conveyance object 51, third three-dimensional information of the conveyance object 51 is acquired from a plurality of different directions. For example, as shown in FIG. 16, in the case where the objects 50 have a shape of regular hexagonal prism and are formed with a recessed part 50a, if the object 50 is placed at the target site 52 with its first surface 50b which adjoins the recessed part 50a facing the target site 52, there is a risk of the object 50 falling over due to its unstable posture. In this case, the stable posture of the object 50 is a posture where a second surface 50c at the opposite side of the recessed part 50a faces the target site 52. In order to find such a stable posture, it is necessary to acquire three-dimensional information of the object 50 from a plurality of different directions.

Figure 18:
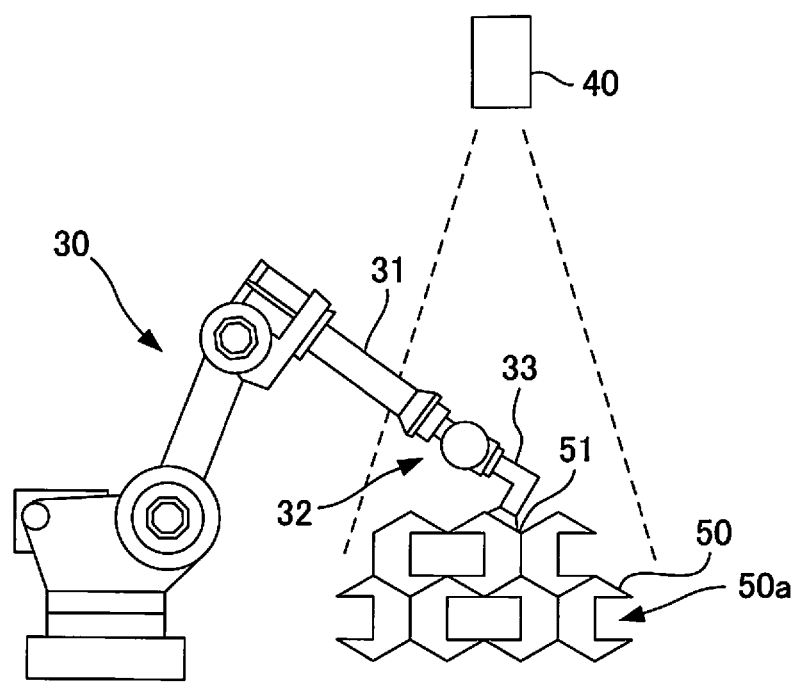
FIG. 18 shows a gripping process of an object.

According to the present embodiment, except for acquiring the third three-dimensional information from a plurality of different directions, the conveyance process is performed in a similar manner to the third embodiment. Accordingly, before the conveyance object 51 is conveyed, the first three-dimensional information acquiring part 12 acquires the first three-dimensional information X1 of the stacked objects 50 (see FIG. 17). Then, the robot 30 is moved to a position where the gripping device 33 can grip the conveyance object 51, as shown in FIG. 18. The position and posture of the robot 30 at this time are stored as the "first robot position".

Figure 19:
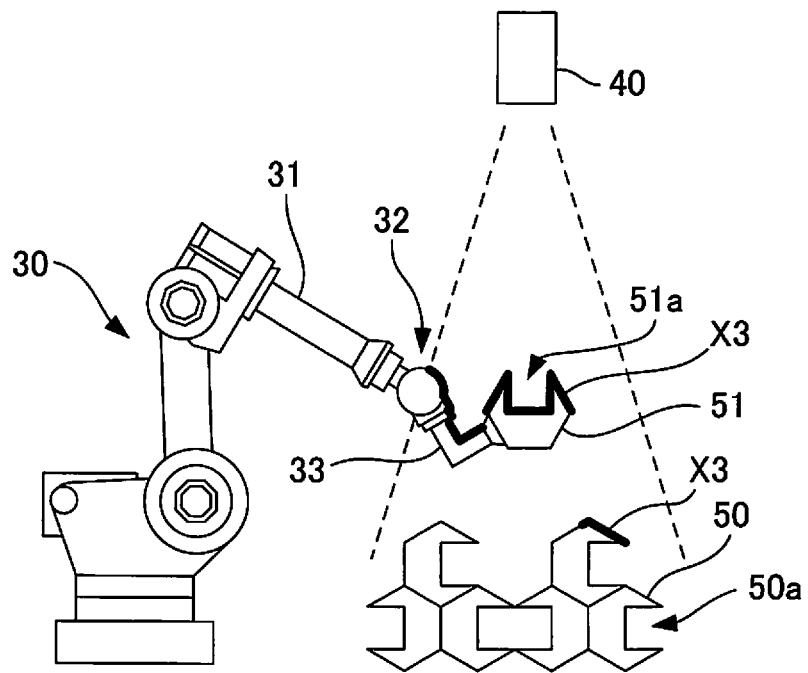
FIG. 19 shows third three-dimensional information.
Figure 20:
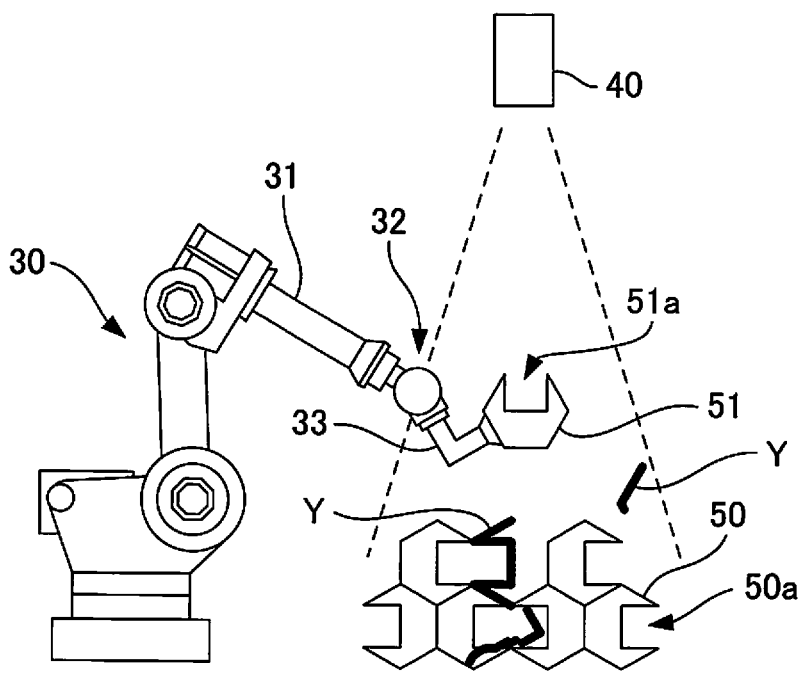
FIG. 20 shows a group of extracted points which are obtained by applying homogeneous transformation to the three-dimensional points of the third three-dimensional information.
Figure 21:
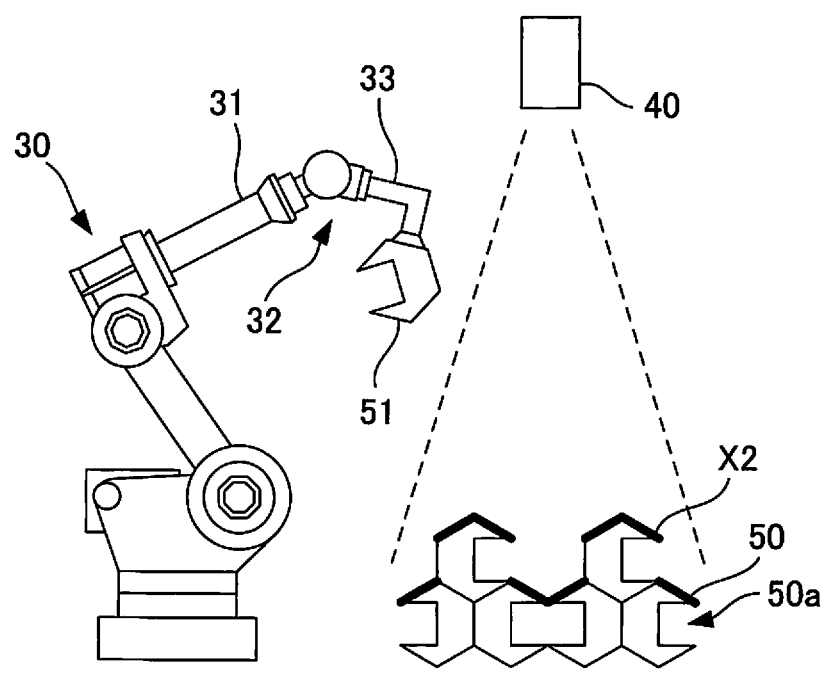
FIG. 21 shows second three-dimensional information.

Furthermore, the conveyance object 51 is moved away from the remaining objects 50, and the wrist 32 is rotated in order to acquire third three-dimensional information of the conveyance object 51 from a plurality of different directions. The position and posture of the robot 30 when acquiring the third three-dimensional information are stored as the "second robot position". FIG. 19 shows the third three-dimensional information X3 which is acquired by the third three-dimensional information acquiring part 24 in the state where the recessed part 51a of the conveyance object 51 is oriented toward the three-dimensional sensor 40. Next, based on the difference between the first robot position and the second robot position, a group Y of extracted points is acquired through homogeneous transformation of the third three-dimensional information. FIG. 20 shows the group Y of extracted points which is obtained by applying the homogeneous transformation to the third three-dimensional information X3 shown in FIG. 19. Furthermore, the conveyance object 51 is moved to the outside of the detection range of the visual sensor 40, and then second three-dimensional information X2 is acquired by the second three-dimensional information acquiring part 16 (see FIG. 21). The first three-dimensional information X1, second three-dimensional information X2, and group Y of extracted points obtained in the above-described manner are used as the basis to acquire three-dimensional shape information of the conveyance object 51 which includes a recessed part 51a, by the shape information acquiring part 18. Once the three-dimensional information of the conveyance object 51 is acquired, in accordance with the respective surface areas, the stable posture of the conveyance object 51 can be determined, based on the center of gravity position of the conveyance object 51, etc.

According to the robot systems 10 according to the above-mentioned various embodiments, the following effects can be achieved:

(1) Even when the three-dimensional shape and dimensions of stacked objects are unknown or when the individual differences between the objects are not negligible, a conveyance process can be appropriately performed. This facilitates a conveyance process for conveying objects which do not necessarily have a constant shape, such as agricultural products, pieces of wood, ores.

(2) The objects are placed at the target site with stable postures, and therefore the objects can be prevented from falling over and being damaged. Further, the objects are placed at the target site with postures according to certain criteria. This can improve the processing efficiency in subsequent processes.

(3) Even in the case where the state of the objects cannot be recognized from the side, for example, when the objects are contained in a container, the three-dimensional shape information of the objects can be acquired.

(4) Since only a single three-dimensional sensor is required to acquire the information necessary for a conveyance process, an inexpensive robot system can be provided.

(5) It is no longer necessary for the robot system to prepare in advance information relating to the distance from the contact part of the object to a reference point of the robot and the stable posture of an object. Therefore, the preparatory process can be simplified.

According to one embodiment, the robot system may include the three-dimensional sensor attached to the tip end part of the arm of the robot. According to one embodiment, the robot system may employ a plurality of robots designed to convey objects stacked at one location. According to one embodiment, one or more robots may successively convey objects stacked at a plurality of different locations. According to one embodiment, the robot system may also be configured to convey objects to a plurality of target sites at different locations.

EFFECT OF THE INVENTION

According to a robot system of the present invention, three-dimensional shape information of an object to be conveyed is acquired based on three-dimensional information before and after an object is taken out. Further, based on the three-dimensional shape information of the object, the position and posture of the robot for placing the object is calculated. This allows the conveyance process to be performed appropriately, even when the shape or dimensions of objects is unknown or when the individual differences between the objects are not negligible.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A robot system configured to successively convey a plurality of stacked objects to a target site, the robot system comprising:
   a three-dimensional sensor configured to acquire three-dimensional information of the objects;
   a robot which comprises a gripping device capable of gripping at least one of the objects;
   a first three-dimensional information acquiring part configured to acquire three-dimensional information of the stacked objects by the three-dimensional sensor as first three-dimensional information;
   an object position acquiring part configured to identify a conveyance object which is an object to be conveyed among the objects and acquire the position of the conveyance object, based on the first three-dimensional information;
   a second three-dimensional information acquiring part configured to acquire, after the conveyance object is gripped by the gripping device and is moved away from other remaining objects by the robot, three-dimensional information of the remaining objects by the three-dimensional sensor as second three-dimensional information;
   a shape information acquiring part configured to acquire, based on the first three-dimensional information and the second three-dimensional information, three-dimensional shape information of the conveyance object which includes a part which is positioned at a dead angle of the three-dimensional sensor when the first three-dimensional information is acquired;
   a placement information acquiring part configured to acquire, based on the three-dimensional shape information of the conveyance object which is acquired by the shape information acquiring part, at least one of a distance from a contact part of the conveyance object to a reference point of the gripping device or the robot and a stable posture of the conveyance object, the contact part being a part of the conveyance object on which the conveyance object contacts the target site when the conveyance object is placed at the target site, the stable posture being a posture with which the conveyance object can be stably placed at the target site; and
   a position and posture calculating part configured to calculate a position and posture of the robot when the conveyance object is placed at the target site, based on at least one of the distance from the contact part to the reference point and the stable posture.

2. The robot system according to claim 1, further comprising a third three-dimensional information acquiring part configured to acquire three-dimensional information of the conveyance object which is gripped by the gripping device by the three-dimensional sensor as third three-dimensional information,
   wherein the shape information acquiring part is configured to acquire three-dimensional shape information of the conveyance object, based on the first three-dimensional information, the second three-dimensional information, and the third three-dimensional information.

3. The robot system according to claim 1, wherein the first three-dimensional information acquiring part is configured to acquire, after at least one of the objects is conveyed, the second three-dimensional information which is obtained when a previous conveyance process is performed, as the first three-dimensional information.

4. The robot system according to claim 1, wherein the three-dimensional sensor is attached to a support separate from the robot.

5. The robot system according to claim 1, wherein the three-dimensional sensor is attached to a tip end part of an arm of the robot.

6. A robot system configured to successively convey a plurality of stacked objects to a target site, the robot system comprising:
   a three-dimensional sensor configured to acquire three-dimensional information of the objects;
   a robot which comprises a gripping device capable of gripping at least one of the objects;

a first three-dimensional information acquiring part configured to acquire three-dimensional information of the stacked objects by the three-dimensional sensor as first three-dimensional information;

an object position acquiring part configured to identify a conveyance object which is an object to be conveyed among the objects and acquire the position of the conveyance object, based on the first three-dimensional information;

a second three-dimensional information acquiring part configured to acquire three-dimensional information of the conveyance object being gripped by the gripping device, by the three-dimensional sensor, as second three-dimensional information;

a shape information acquiring part configured to acquire, based on the first three-dimensional information and the second three-dimensional information, three-dimensional shape information of the conveyance object which includes a part which is positioned at a dead angle of the three-dimensional sensor when the first three-dimensional information is acquired;

a placement information acquiring part configured to acquire, based on the three-dimensional shape information of the conveyance object which is acquired by the shape information acquiring part, at least one of a distance from a contact part of the conveyance object to a reference point of the gripping device or the robot and a stable posture of the conveyance object, the contact part being a part of the conveyance object on which the conveyance object contacts the target site when the conveyance object is placed at the target site, the stable posture being a posture with which the conveyance object can be stably placed at the target site; and a position and posture calculating part configured to calculate a position and posture of the robot when the conveyance object is placed at the target site, based on at least one of the distance from the contact part to the reference point and the stable posture.

7. The robot system according to claim 6, wherein at least one of the position and posture of the robot when the second three-dimensional information is acquired differs from when the conveyance object is gripped by the gripping device.

* * * * *